(12) United States Patent
Maerzhaeuser

(10) Patent No.: US 8,027,753 B2
(45) Date of Patent: Sep. 27, 2011

(54) MICROSCOPE CONTROL UNIT

(75) Inventor: Stephan Maerzhaeuser, Wetzlar (DE)

(73) Assignee: Maerzhaeuser Wetzlar GmbH & Co. KG, Wetzlar (DE)

( * ) Notice: Subject to any disclaimer, the term of this patent is extended or adjusted under 35 U.S.C. 154(b) by 0 days.

(21) Appl. No.: 12/719,466

(22) Filed: Mar. 8, 2010

(65) Prior Publication Data

US 2011/0157691 A1    Jun. 30, 2011

(30) Foreign Application Priority Data

Dec. 27, 2009    (DE) .................... 20 2009 017 670 U

(51) Int. Cl.
*G02B 21/26* (2006.01)
*G05D 3/00* (2006.01)

(52) U.S. Cl. ........................ 700/302; 359/393; 700/85

(58) Field of Classification Search .................. 359/368, 359/372–377, 379–380, 382–383; 700/85, 700/302

See application file for complete search history.

(56) References Cited

U.S. PATENT DOCUMENTS

| 5,557,456 | A | * | 9/1996 | Garner et al. | 359/393 |
| 7,262,907 | B2 | * | 8/2007 | Rentzsch | 359/368 |
| 2003/0021017 | A1 | * | 1/2003 | Eijsackers et al. | 359/368 |
| 2004/0068333 | A1 | * | 4/2004 | Cantello et al. | 700/66 |
| 2005/0111087 | A1 | * | 5/2005 | Knoblich et al. | 359/368 |
| 2009/0168161 | A1 | * | 7/2009 | Guiney | 359/391 |
| 2009/0180177 | A1 | * | 7/2009 | Gilbert | 359/373 |

* cited by examiner

*Primary Examiner* — Mark Consilvio
(74) *Attorney, Agent, or Firm* — Crowell & Moring LLP

(57) ABSTRACT

A microscope control unit which is composed of a bracket-shaped support frame having a support area, a pillar standing vertically erect on the support area, and a support arm, which emanates from the upper end of the pillar and is aligned parallel to the support area.

7 Claims, 2 Drawing Sheets

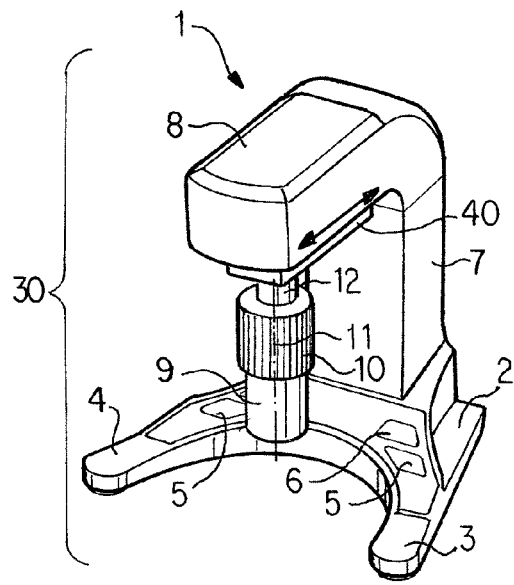
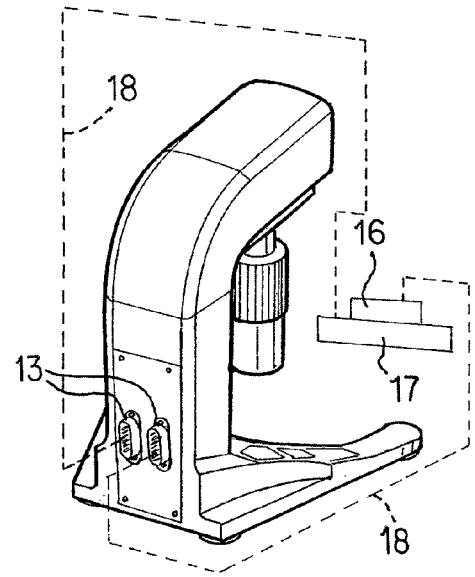
Fig. 1a  Fig. 1b
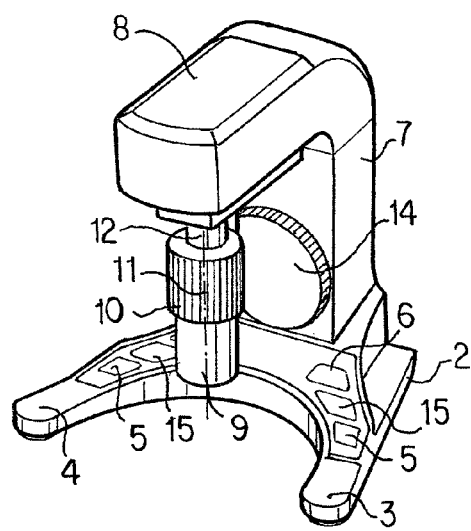
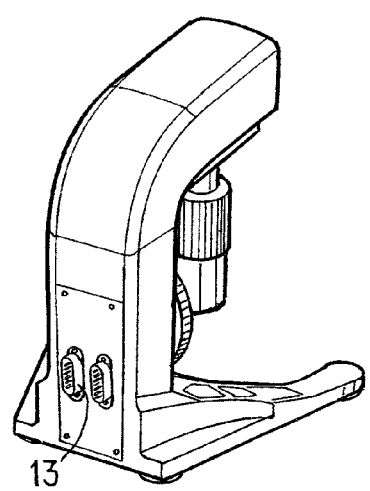
Fig. 2a  Fig. 2b

MICROSCOPE CONTROL UNIT

BACKGROUND OF THE INVENTION

The invention relates to a microscope control unit comprising manually operable, cylindrical operating elements for x/y-adjustment of a mechanical stage and alternatively for the z-adjustment of the focus setting of a microscope.

It is well-known to attach, to the underside of mechanical stages, manually operable operating elements that separately transmit, e.g., by means of cable controls or gearwheels, the rotation of cylindrical barrels to the stage surfaces to be displaced. The frictional forces to be overcome in this case give the operator a feeling for the stage movement. At least one of the moved stage surfaces usually carries the operating elements along. The operator's hand must follow on the working surface. The operating elements must be attached to different sides of the microscope stage for left-handers or right-handers. The possibility of retrofitting is associated with a higher design effort. Sufficient clearance for the positioning of the hand rest and arm rest for the operator must be kept free in the area of the microscope stage surface.

For motor-driven stage adjustments, the rotation of the operating elements attached to the mechanical stage can be converted to electrical counter and control pulses. The operating elements can be provided with adjustable friction torques to simulate the feel of a mechanical coupling between operating element and stage movement for the operator.

For motor-driven stage adjustments, it is also known to accommodate the manually operable operating elements in separate housings and to transmit the control signals for the stage adjustment through electrical lines and plug connections attached to the mechanical stage. To this end, trackball and joystick control units are well-known in particular. Both right-handers and left-handers can operate these control units since they can be freely positioned on the work stage. The disadvantage is that the mechanical stage cannot be reliably set to a precise position because of the ease of movement of the operating elements. In the joystick controller, the operating lever automatically jumps back to the zero position after the operator lets go of a setting that was achieved. To make a correction or choose a new setting, the operator must again make out the zero position by touch with his/her finger. An undesired stage adjustment can be triggered by accidently nudging the operating lever.

For manual, mechanically-operated stage adjustments when using control units with interconnected coarse and fine adjustments of the operating elements, a rapid stage adjustment over large adjustment paths and a precise positioning in a small observation area are usually accomplished through different gear ratios. The respective operating elements are usually arranged coaxially aligned with one another with different roll diameters so that the operator can comfortably change his/her grip from coarse to fine adjustment or vice versa.

For electronic transmission of the motion of the operating elements to servomotors, it is possible to adjust different translations of the counter and control pulses to the engine speeds by means of electrical switches and software programming.

In addition to operating elements for the x/y mechanical-stage adjustment, microscopes also have operating elements for the z-adjustment of the mechanical stage or of the body tubes for the focus setting of the lens. These are usually attached to the microscope stand and therefore require a laborious change of grip from the microscope stage to the microscope stand.

The housings of the already described trackball and joystick controllers therefore also have additional control wheels for the z-drive in handy proximity to the x/y operating elements. The operator must therefore prepare himself/herself for different reactions to the different movements for adjusting a control level or for the rolling of a ball and the rotating of a wheel. The operator is therefore required to exercise additional concentration when changing grip from one operating element to another.

SUMMARY OF THE INVENTION

An object of the invention is to provide an improved microscope control unit.

Another object of the invention is to provide a microscope control unit that permits the uniform arrangement of cylindrical operating elements for the x/y-adjustment and also for the z-adjustment and in which all operating elements are arranged and/or adjustable in an ergonomically handy position in relationship to each other.

A further object of the invention is to provide a microscope control unit in which the arrangement of the operating elements is equally appropriate for left-handers and right-handers.

An additional object of the invention is to provide a microscope control unit in which it is possible to position the arrangement of operating elements as desired with respect to the microscope stand on the work stage.

These and other objects are achieved in accordance with the present invention by providing a control unit of the above-mentioned type in which the control unit comprises a bracket-shaped support frame comprising a support area, a pillar standing vertically erect on the support area and a support arm, which emanates or projects from the upper end of the pillar and is aligned parallel to the support area. Advantageous refinements and preferred aspects can be found in the features of the dependent claims.

The construction of the control unit as bow-shaped support frame corresponds to the shape of simple microscopes and therefore also visually conforms to the broader equipment environment. The control unit can be reliably displaced on the workplace by grasping the support frame in the transition region from the pillar to the support arm.

The arrangement of the x/y operating elements on the underside of the support arm takes the arrangement on the mechanical stage that is familiar to the operator and transfers it to a freely positionable control unit.

The arrangement of an operating element for the z-adjustment on the pillar of the support frame is likewise identical to the usual arrangement on a microscope stand. The arrangement of the z operating element in the interior space of the support frame provides direct spatial proximity to the operating elements for the x/y-adjustment so that all operating elements are within finger reach without moving the hand. The function switches arranged on the top side of the support area are also within finger reach.

By arranging the x/y operating elements on a slide, which is attached to the underside of the support arm so that it can be displaced longitudinally, it is possible to adjust the proximity of these operating elements to a z operating element on the pillar as a function of the operator's hand size and finger length.

The construction of the x/y operating elements as cylinders, which are of different diameters and can rotate around their longitudinal axis and which are arranged perpendicular to the support arm and coaxially aligned with one another, gives the operator the familiar control function of the drive on the microscope stage. The functional unit suspended on the support arm is structurally identical to the known functional unit, so that economical retrofitting with existing functional units is also assured.

Barrels of different diameters that are pushed onto the cylinders in a longitudinally displaceable manner facilitate the operator's distinction between the x- and y-adjustment control when gripping. It is possible to adjust the height of the barrels vis-à-vis the work stage by displacing the barrels along their rotational axis and thereby adapt their position to the size of the operator's hand.

To generate a modifiable frictional force, the cylinders can be rotatable vis-à-vis their rotational axis mounted in the support arm.

The operating element for the z-adjustment is advantageously constructed as a disc with an axis perpendicular to the pillar. The thickness of the disc should allow comfortable contact with an operator's fingertip. The diameter of the disc can be adapted to the adjustment range of the barrels for the x/y-adjustment so that the disc will also lie in the gripping region of the fingers for different operator hand sizes.

The support area of the support frame is advantageously equipped with two legs that open up emanating from the pillar. The operator's palm can rest on the work table between the legs so that the support frame is decoupled from the hand rest.

Identical functional switches can be arranged symmetrically to one another on the top side of the legs so that they can be operated equally by left-handers and right-handers. The functional switches can trigger an electronic change in translation for coarse or fine adjustment of the operating elements in a known manner. But it is also possible to provide a freely programmable switch by means of which it is possible to initiate, e.g., storage of the coordinates of an adjusted observing position.

An electronic control unit for controlling motors, which are coupled to the operating elements and serve for x/y/z-adjustment and replace a conventionally separate motor control unit, can also advantageously be integrated into the pillar of the support frame. The connector plugs for signal lines for transmission of control signals from the microscope control unit to the mechanical stage or to the stand of a microscope are advantageously attached to the rear side of the pillar of the support frame.

BRIEF DESCRIPTION OF THE DRAWINGS

The invention will be described in further detail hereinafter with reference to illustrative embodiments of the new microscope control unit depicted schematically in the accompanying drawing figures, which show:

FIGS. 1a, b two views of a control unit for x/y-adjustment and

FIGS. 2a, b two views of a control unit having an additional z-adjustment.

DETAILED DESCRIPTION OF PREFERRED EMBODIMENTS

Figure 3:
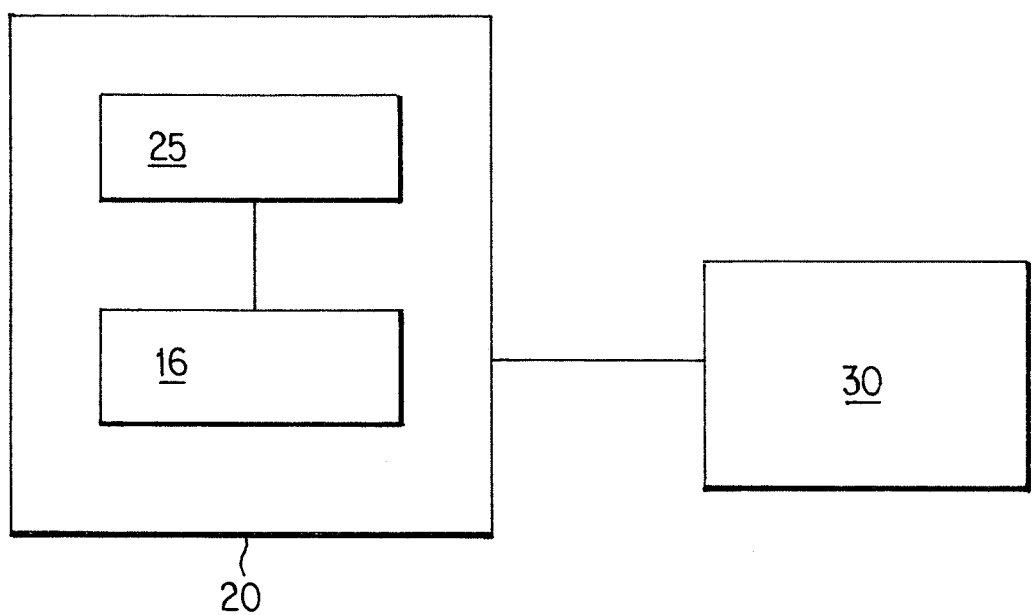

FIG. 1a shows a perspective view of a microscope control unit 30 having a bow-shaped or bracket-shaped support frame 1. The support area 2 has two spread legs 3 and 4. Two functional switches 5, 6 are arranged mirror-symmetrical to one another on the top sides of the legs 3, 4. The functional switch 5 serves, e.g., for changing the transit speed. Functional switch 6 serves, e.g., for initiating a storage function.

A vertically upstanding pillar 7 is mounted on the support area 2 in the region where the legs 3, 4 converge. A support arm 8 aligned parallel to and overarching the support area 2 projects from the upper end of the pillar 7. Two operating elements for the x/y-adjustment are suspended on the underside of the support arm 8 with their rotational axes perpendicular to the support arm 8. The operating elements are constructed as cylindrical barrels 9, 10 with fluting that provides a secure grip. The two barrels 9, 10 have different diameters for feelable discriminability. The operator's hand is placed on the work table between the legs 3, 4 underneath the barrels 9, 10. The barrels 9, 10 are each mounted on longitudinally displaceable axis cylinders, which are associated with them and form the rotational axes for the barrels 9, 10. An axis cylinder 11 for barrel 9 is indicated in the figure. The height of the barrels 9, 10 relative to the support area 2 can be changed by the longitudinal displacement. For longitudinal displacement, the barrels 9, 10 are guided in longitudinal grooves (not shown) in the axis cylinders, whereby there exists a rotary coupling of the barrels 9, 10 to their axis cylinders for every height setting.

Another rotary cylinder 12 that allows the frictional force of the axis cylinder 11 to be changed vis-à-vis a bearing arrangement in the support arm 8 can be mounted on the axis cylinder 11. An identical rotary cylinder can also be associated with the axis cylinder for the barrel 10. The barrels 9, 10 have an expanded inside diameter in their upper region pointing to the support arm 8, allowing them to be pushed over the respective rotary cylinder.

The operating elements 9, 10, which are coaxially aligned with each other, are arranged on a slide 40, which is displaceably fastened to the underside of the support arm 8 at a distance to pillar 7.

FIG. 1b depicts the support frame 1 in a perspective view from the rear side. Connector plugs 13 for attaching signal lines 18 are provided on the rear side of pillar 7. The signal lines 18 may be connected to the mechanical stage 16 or the stand 17.

FIGS. 2a, b depict the same support frame 1 as in FIGS. 1a, b, but with another operating element in the interior space of the bracket-shaped support frame 1. In this case, a disc wheel 14 for z-adjustment is attached to the pillar 7. The disc wheel 14 can be rotated around an axis that is perpendicular to pillar 7. The thickness of the disc wheel 14 provides a secure rest for the operator's fingertip. The diameter of the disc wheel 14 is chosen such that a secure grip on the operating elements for different height positions of the barrels 9, 10 is assured.

An additional function switch 15 for changing the transit speed in the z direction is arranged on the top side of the legs 3, 4.

The interior space of pillar 7 provides room for integrating an additional control unit for the drive of servomotors for realizing the travel distances and transit speeds initiated by the control elements.

FIG. 3 shows a block diagram of a microscope control unit 30 that is connected to a microscope 20. The microscope 20 includes at least one motor 25 that controls a mechanical stage 16.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A microscope control unit comprising:
   manually operable, cylindrical operating elements for x/y-adjustment of a mechanical stage of a microscope;
   a bow-shaped support frame comprising:
      a support base;
      a pillar standing vertically erect on the support base; and
      a support arm, which projects from the upper end of the pillar and is aligned parallel to the support base; and
   an electronic control unit that is integrated into the pillar for controlling motors that are coupled to the operating elements for the x/y-adjustment and serve for x/y-adjustment, wherein:
   the operating elements for the x/y-adjustment are attached to the underside of the support arm,
   the operating elements for the x/y-adjustment are mounted on a slide, which is arranged in a laterally displaceable manner on the underside of the support arm such that a distance between the operating elements and the pillar is adjustable,
   the operating elements for the x/y-adjustment comprise axis cylinders which are of different diameters, rotate around a shared longitudinal axis, are arranged perpendicular to the support arm, and are coaxially aligned with one another,
   the microscope control unit further comprises longitudinally displaceable cylindrical barrels of different diameters that are mounted on the respective axis cylinders, and
   the support base comprises two spread apart legs that emanate from the pillar.

2. A microscope control unit according to claim 1, further comprising an operating element for z-adjustment that is arranged on the pillar on an inside surface of the support frame.

3. A microscope control unit according to claim 2, wherein the operating element for the z-adjustment is constructed as a disc wheel having a rotational axis perpendicular to the pillar.

4. A microscope control unit according to claim 1, wherein switches for setting the mode of operation of the operating elements or the control unit are arranged on an upper surface of the spread apart legs.

5. A microscope control unit according to claim 4, wherein the switches for setting the mode of operation of the operating elements or the control unit are identical, and are arranged on the upper surface of the spread apart legs in a mirror-symmetrical manner.

6. A microscope control unit according to claim 1, wherein additional rotary cylinders for adjusting a modifiable frictional force of the axis cylinders vis-à-vis their longitudinal axis are mounted on the support arm and are arranged co-axially with respect to the axis cylinders.

7. A microscope control unit according to claim 1, wherein connector plugs for connecting signal lines to the mechanical stage or a stand of the microscope are arranged on the rear side of the pillar.

* * * * *